United States Patent
Wang et al.

(10) Patent No.: US 7,801,066 B2
(45) Date of Patent: Sep. 21, 2010

(54) METHOD FOR TRANSITIONING A WIDE AREA NETWORK MODEM OF A MOBILE COMMUNICATION DEVICE BETWEEN A POWER SAVING MODE AND A SCAN MODE

(75) Inventors: Huai Y. Wang, Coconut Creek, FL (US); Pieter-Paul S. Giesberts, The Hague (NL); Gerrit W. Hiddink, Utrecht (NL); Zaffer S. Merchant, Parkland, FL (US); Henri Moelard, Maarssenbroek (NL); Floyd D. Simpson, Lake Worth, FL (US)

(73) Assignee: Motorola Mobility, Inc., Libertyville, IL (US)

( * ) Notice: Subject to any disclaimer, the term of this patent is extended or adjusted under 35 U.S.C. 154(b) by 649 days.

(21) Appl. No.: 11/831,170

(22) Filed: Jul. 31, 2007

(65) Prior Publication Data
US 2009/0034444 A1 Feb. 5, 2009

(51) Int. Cl.
*G08C 17/00* (2006.01)
(52) U.S. Cl. ............... 370/311; 455/13.3; 455/13.4
(58) Field of Classification Search ........... 370/311, 370/336–338; 455/13.3, 13.4, 509, 553.1
See application file for complete search history.

(56) References Cited

U.S. PATENT DOCUMENTS

| | | | |
|---|---|---|---|
| 6,329,944 B1 * | 12/2001 | Richardson et al. ......... 342/42 |
| 7,117,008 B2 | 10/2006 | Bajikar | |
| 7,146,133 B2 | 12/2006 | Bahl et al. | |
| 7,542,728 B2 | 6/2009 | Bitran et al. | |
| 2005/0059347 A1 | 3/2005 | Haartsen | |
| 2006/0205401 A1 | 9/2006 | Palin et al. | |
| 2006/0215601 A1 | 9/2006 | Vleugels et al. | |
| 2006/0281436 A1 | 12/2006 | Kim et al. | |
| 2006/0292987 A1 | 12/2006 | Ophir et al. | |
| 2007/0066314 A1 | 3/2007 | Sherman et al. | |
| 2007/0135162 A1 | 6/2007 | Banerjea et al. | |
| 2007/0183383 A1 | 8/2007 | Bitran et al. | |

(Continued)

FOREIGN PATENT DOCUMENTS

EP 1119137 A 7/2001

(Continued)

OTHER PUBLICATIONS

Christian Hoymann and Markus Grauer, "WiMAX Mobility Support", Proceedings of ITG Conference, part of the VDE-Congress 2006, Oct. 2006, pp. 85-90.

(Continued)

*Primary Examiner*—Albert T Chou
(74) *Attorney, Agent, or Firm*—Sylvia Chen; Scott M. Garrett

(57) ABSTRACT

A mobile communication device (102) includes a wide area network (WAN) modem (122) for communicating over a wireless WAN. During a voice call, the WAN modem operates in a power save mode (206) but must occasionally scan for handover candidate base stations (208). The modem goes directly from the power save mode to a scan mode at an agreed upon time, first selected by the mobile communication device, but which may be modified by the base station.

14 Claims, 3 Drawing Sheets

U.S. PATENT DOCUMENTS

| | | | |
|---|---|---|---|
| 2007/0275746 A1* | 11/2007 | Bitran | 455/509 |
| 2008/0130620 A1 | 6/2008 | Liu et al. | |
| 2008/0144550 A1 | 6/2008 | Makhlouf et al. | |
| 2008/0146155 A1 | 6/2008 | Makhlouf et al. | |
| 2008/0146156 A1 | 6/2008 | Makhloug et al. | |
| 2008/0146172 A1 | 6/2008 | Makhlouf et al. | |
| 2008/0205365 A1 | 8/2008 | Russell et al. | |
| 2008/0212542 A1* | 9/2008 | Kung et al. | 370/336 |
| 2009/0004972 A1 | 1/2009 | Wang et al. | |
| 2009/0005111 A1* | 1/2009 | Wang et al. | 455/553.1 |
| 2009/0252137 A1* | 10/2009 | Bitran et al. | 370/338 |

FOREIGN PATENT DOCUMENTS

| | | |
|---|---|---|
| EP | 1729463 A | 12/2006 |

OTHER PUBLICATIONS

The Institute of Electrical and Electronics Engineers, Inc (IEEE), "Part 16: Air Interface for Fixed and Mobile Broadband Wireless Access Systems, Amendment 2: Physical and Medium Access Control Layers for Combined Fixed and Mobile Operation in Licensed Bands, and Corrigendum 1 (IEEE 802.16e-2005)", Feb. 28, 2006, pp. i-xxxix, 1-11, and 228-34.

Zdenek Becvar and Jan Zelenka, "Implementation of Handover Delay Timer into WiMAX", Sixth Conference on Telecommunications, May 2007, p. 401-404.

Patent Cooperation Treaty, "Notification of Transmittal of the International Search Report and the Written Opinion of the International Searching Authority" for International Application No. PCT/US2008/071657, Nov. 28, 2008, pp. 1-9.

Arto Palin and Mauri Honkanen, "VoIP Call Over WLAN with Bluetooth Headset—Multiradio Interoperability Solutions" Personal, Indoor and Mobile Radio Communications, IEEE 16th International Symposium on Berlin, German, Sep. 11-14, 2005, pp. 1560-1564 vol. 3, XP010927402, Piscataway, New Jersey.

Patent Cooperation Treaty, "Notification of Transmittal of the International Search Report and the Written Opinion of the International Searching Authority, or the Declaration" for International Application No. PCT/US2008/068484, mailed Dec. 4, 2008, pp. 1-19.

Patent Cooperation Treaty, "Notification of Transmittal of the International Search Report and the Written Opinion of the International Searching Authority, or the Declaration" for International Application No. PCT/US2008/068449, mailed Feb. 9, 2009, pp. 1-14.

United States Patent and Trademark Office, "Office Action Summary" for U.S. Appl. No. 11/772,160, Dec. 29, 2009, pp. 1-7.

United States Patent and Trademark Office, "Office Action Summary" for U.S. Appl. No. 11/772,146, Apr. 5, 2010, pp. 1-12.

* cited by examiner

METHOD FOR TRANSITIONING A WIDE AREA NETWORK MODEM OF A MOBILE COMMUNICATION DEVICE BETWEEN A POWER SAVING MODE AND A SCAN MODE

FIELD OF THE INVENTION

The invention relates generally to mobile communications, and more particularly to transitioning between a power save mode and a scan mode while conducting communication activity.

BACKGROUND OF THE INVENTION

Mobile communication systems and devices are in widespread use in most metropolitan regions of the world. In many places, wireless communications service is even being deployed where there is no wired communication service, due to the lower cost of infrastructure equipment. As mobile communications technology has matured, various features and additional services have been added beyond simply circuit-switch radiotelephony. Data services have been added so that subscribers can access information over public wide area networks and wireless local area networks. As mobile data networks have matured, there has been interest in carrying real-time information such as voice over them. Voice over Internet Protocol (VoIP) has been deployed with success at fixed data terminals, such as personal computers, and interest in using VoIP over mobile data networks is growing.

Interest has been focused on increasing the information throughput to and from subscriber devices over wide area wireless mobile data networks. One technology that has garnered interest for provided high quality, high capacity service is that specified by the IEEE 802.16e specifications, known as the Worldwide Interoperability for Microwave Access, or "WiMAX." The relatively high data capacity of this protocol allows for VoIP operation as it can reliably transmit data with a quality of service needed for time-sensitive applications.

To facilitate power saving operation, the WiMAX protocol allows a mobile communication device to establish a VoIP call with a power save mode. During the power save mode, the framing may be configured to alternate between an active interval and a sleep interval. During the active interval, the mobile communication device receives data from a serving base station, and transmits data to the serving base station. The data includes both VoIP data and any other data for other applications that may be running on the mobile communication device. During the sleep interval, the mobile communication device places the radio modem into a low power or sleep state to reduce average power consumption.

However, the mobile communication device must periodically conduct some mobility management functions, including scanning neighbor base stations. Due to the time-sensitive nature of the data being carried during the active interval, the mobile communication device must remain tuned to the present base station. Thus, scanning must be done outside of the active interval. So, in scan mode, what was the sleep interval during power save mode becomes a scan interval during scan mode. During the scan interval the mobile communication device tunes away from the present base station to receive signals from other base stations within reception range of the mobile communication device. Typically the serving base station transmits a neighbor list to the mobile communication device during, or shortly after the affiliation or handover process when the base station becomes the present serving base station.

Under the present implementation of the WiMAX protocol, which supports both sleep mode and scan mode as described so far, a mobile communication device must transition from one mode to the other, and vice versa. To make a transition, the mobile communication device transmits a request to the base station. Upon transmitting the request, however, the mobile communication device is deactivated from power save mode, and must have the radio modem on until the start of scan mode. As defined now, the transition period is at least 8 frames long. Thus, to transition to and from scan mode, the mobile communication device will have two periods of at least 8 frames each where it is not scanning, nor in power save mode. It is therefore desirable to eliminate the transition time to decrease the power consumption of the mobile communication device.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION OF THE INVENTION

While the specification concludes with claims defining features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the invention.

Figure 1:
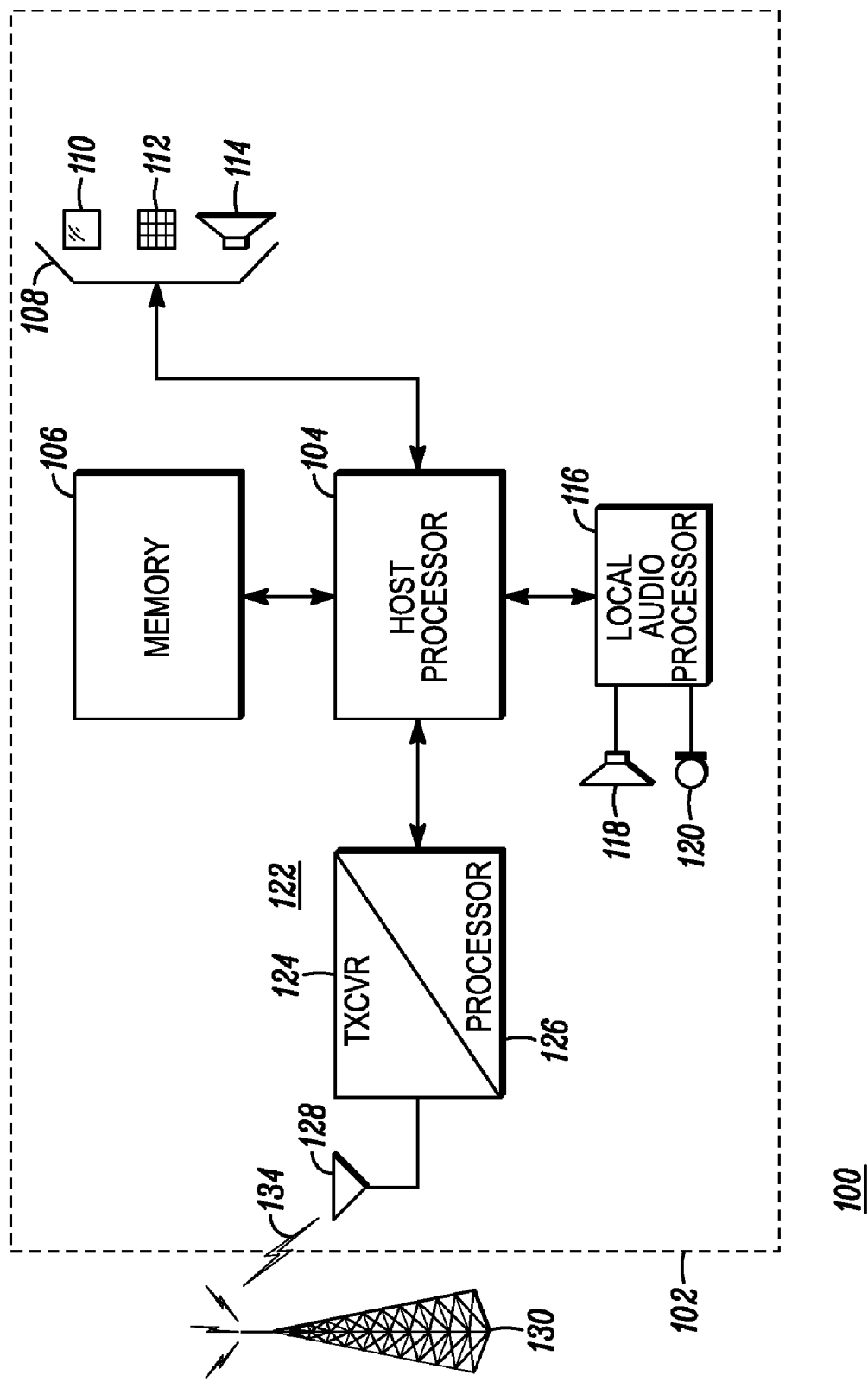
FIG. 1 shows a schematic block diagram of a mobile communication device 102, in accordance with an embodiment of the invention.

Referring now to FIG. 1, there is shown a schematic block diagram 100 of a mobile communication device 102, in accordance with an embodiment of the invention. A host processor 104 controls operation of the various components and subsystems of the mobile communication device. As shown here the host processor may be an abstraction of one or more microprocessors, digital signal processors and other such processor used routinely in the design of mobile communication devices. The host processor is coupled to a memory 106 which stores instruction code to be executed by the host processor. The memory may include read only memory (ROM) elements for long term storage, as well as executable memory for instantiating data structures and algorithms, and may include volatile and non-volatile components. To facilitate operation of the mobile communication device, a user interface 108 is provided, and includes, for example, a graphical display 110, a keypad and buttons 112, and other tactile, audible, and visual elements 114. To facilitate voice communication the mobile communication device includes an audio processor 116. The audio processor converts digital audio signals into analog audio signals to be played over a audio transducer 118 such as an earpiece or speaker. Likewise the audio processor converts sounds received at a microphone 120 into digital signals to be transmitted by the mobile communication device.

To facilitate mobile communication the mobile communication device comprises a wide area network (WAN) modem 122. The WAN modem is a radio modem having a radio transceiver portion 124 and a processor portion 126. The processor portion prepares data to be sent for transmission, and processes data received over the transceiver for further processing by the host processor. The WAN modem communicates with a WAN base station 130 over an air interface or radio link 132. In accordance with an embodiment of the invention, the WAN modem may operate, for example, in accordance with IEEE specification 802.16e-2005, commonly referred to as the "WiMAX" specification, and operate in the 2.5-2.6 GHz band.

Furthermore, in addition to carrying real-time information, the WAN modem, being used for mobile communication, is preferably operated with regard to conserving battery power by operating in a power save mode. In an exemplary power save mode, the WAN alternates between a listening or active interval and a sleep interval. In a WiMAX system a power save operation may be configured to alternate between an active interval of two 5 millisecond frames followed by a sleep interval of two 5 ms frames. The 2/2 format may also be used for neighbor scan operation.

Figure 2:
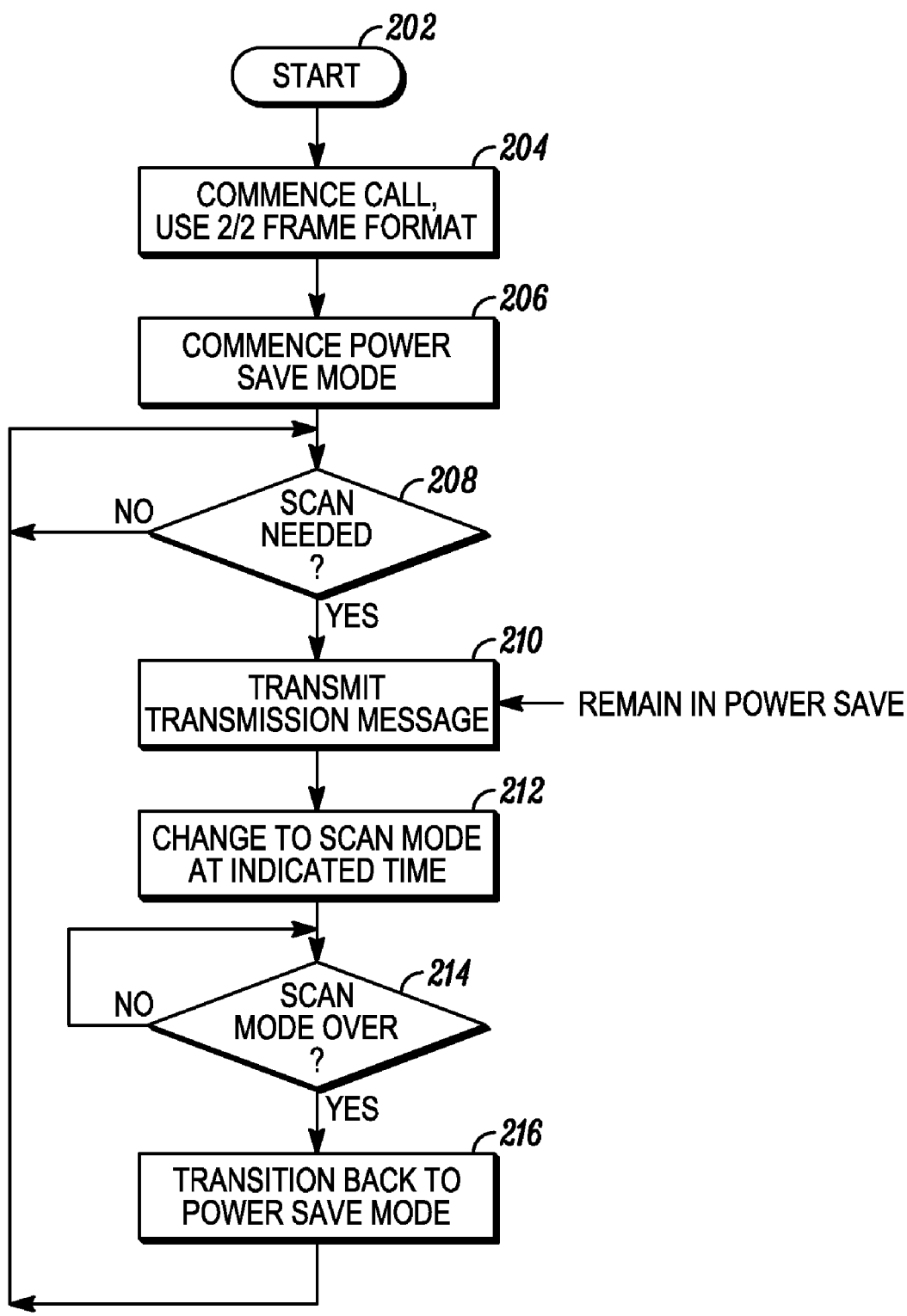
FIG. 2 shows a flow chart diagram of a method of transitioning a WAN modem of a mobile communication device between a power saving mode and a scan mode, in accordance with an embodiment of the invention.

Referring now to FIG. 2, there is shown a flow chart diagram 200 of a method of transitioning a WAN modem of a mobile communication device between a power saving mode and a scan mode. At the start 202 of the method, the mobile communication device is powered up and ready to engage in communication activity. At some point subsequently, the mobile communication device commences a call over the WAN modem (204). The call involves communicating time-sensitive data, such as real-time voice data. Under a WiMAX implementation, the WAN modem uses a 2/2 framing format, alternating between an active interval of 2 frames followed by a sleep interval of 2 frames. Thus the WAN modem commences operation in a power save mode (206). The Wan modem continues operating in the power save mode until a neighbor scan is needed (208).

To initiate the scan mode, the WAN modem transmits a scan transition message to the serving base station (210). The scan transition message indicates when the scan mode is requested to commence, such as by, for example, including a frame offset to indicate which frame, offset from the present frame, the scan mode will start. In a WiMAX WAN, the scan transition message may be embodied using a MOB_SCN-REQ message. Alternatively the scan mode may start at an agreed upon or default offset. Subsequent to transmitting the scan transition message, the WAN remains in the power save mode until the start of the identified or default frame time occurs when the scan mode is to commence, whereupon the WAN modem begins scanning operation (212). The scan mode commences for duration which may be selected in a variety of way (214). Upon completion of the scan mode, the WAN modem transition directly to the power save mode (216), and the method repeats as necessary, while the WAN is continuing the call.

Figure 3:
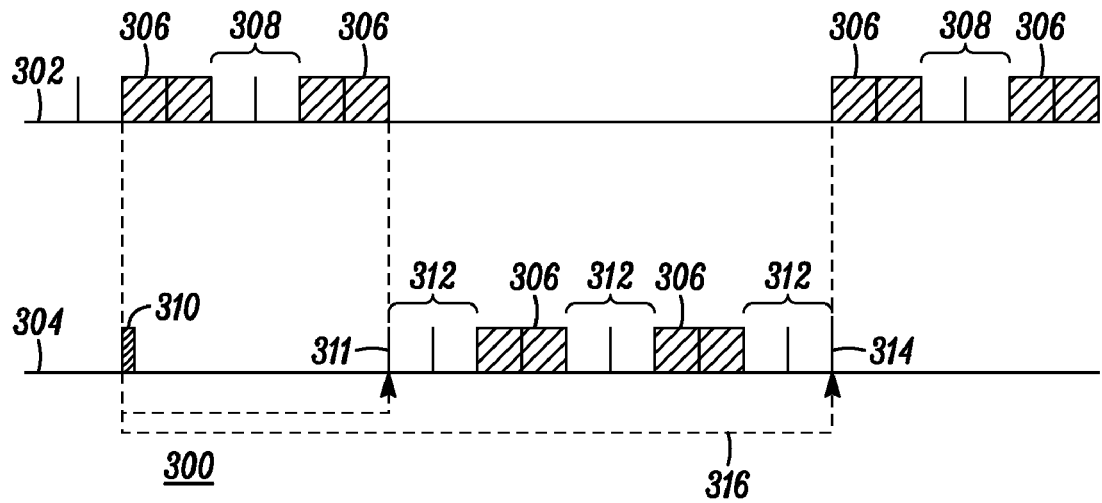
FIGS. 3 and 4 show a WAN framing diagram showing transitioning between a power save mode and a scan mode, in accordance with an embodiment of the invention.

Referring now to FIG. 3, there is shown a WAN framing diagram 300 showing transitioning between a power save mode 302 and a scan mode 304. The two modes are shown on separate lines here for clarity, but, as will be appreciated by those skilled in the art, these modes are simply modes of operation in a given WAN link. Thus, line 302 shows activity associated with the power save mode, and line 304 shows activity associated with the scan mode. Communication activity is carried out during both modes. Furthermore, in the present example, the WAN is a WiMAX WAN, and thus the WAN modem operates with 2-frame listening (active) window and 2-frame sleep window. It will be appreciated by those skilled in the art that, although discussed here using a 2/2 active/sleep frame format, other arrangements may be used within the scope of the invention.

While in the power save mode, the WAN modem alternates between active intervals 306 and sleep intervals 308. In an active interval the WAN modem receives data from, and transmits data to a WAN base station in support of communication activity being carried out by the mobile communication device. During the sleep interval, the WAN modem is powered down to reduce average power consumption, and the WAN base station does not transmit to the WAN modem, and instead buffers any data it may have until the next active interval.

To commence the scan mode, according to an embodiment of the invention, during an active interval 306, the WAN modem transmits a scan request message 310. The scan transition message indicates when the scan mode will commence 311, such as, for example, by a frame offset number indicating how many frames from the present frame the scan mode will commence. Alternatively, the scan transition message may propose a scanning pattern and start frame, with the base station responding, specifying the pattern and start frame to be used by the mobile communication device. Upon arrival of the indicated time 311, the WAN modem commences scan mode operation by conducting neighbor scans during scan intervals 312, alternating with interleaving intervals 306. Essentially, scan intervals replace sleep intervals in the 2-frame/2-frame sleep pattern, with no transition mode in between power save mode and scan mode. At the conclusion of the scan mode 314, the WAN mode transitions back to the power save mode, again without operating in a transition mode.

Figure 4:
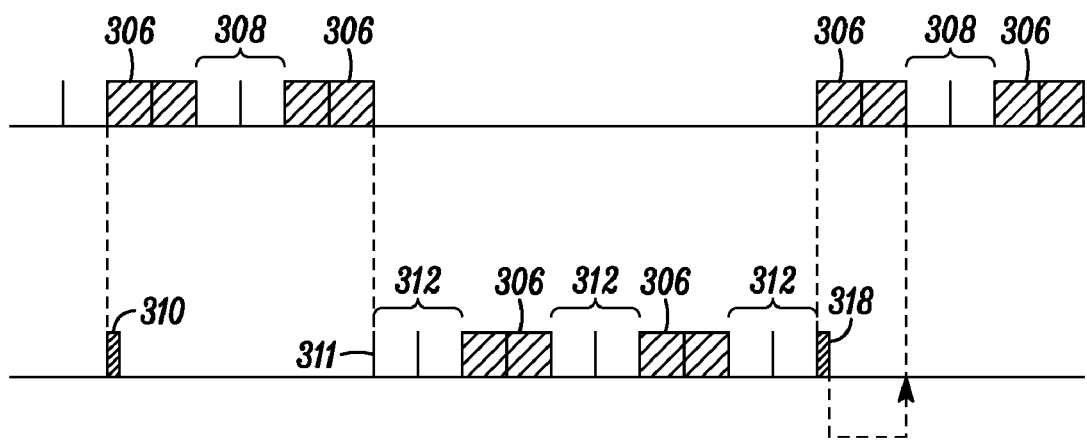

There may be more than one way to re-activate sleep mode operation after completing scan operations. One alternative manner is by including in the scan transition message a scan end offset to indicate the frame in which the sleep mode operation will resume, as indicated by line 316. Alternatively, as shown in FIG. 4, a power save transition message 318 maybe transmitted during an interleaving interval 306 by the WAN modem, indicating when the power save mode is to resume. In a further alternate embodiment, the power save transition message 318 may be a reactivate power save mode message transmitted by the WAN base station and received at the WAN modem, indicating when the WAN modem is to resume sleep intervals rather than scan intervals during the second half of the 2/2 framing format. The indication may be, for example, an offset, or it may simply be by default.

This invention can be embodied in other forms without departing from the spirit or essential attributes thereof. Accordingly, reference should be made to the following claims, rather than to the foregoing specification, as indicating the scope of the invention.

What is claimed is:

1. A method for transitioning a wide area network (WAN) modem of a mobile communication device between a power saving mode and a scan mode, the power saving mode alternating between an active interval and a sleep interval, the method comprising:

transmitting, from the WAN modem while operating in the power saving mode, a scan transition message to a serving base station, the scan transition message indicating the WAN modem will transition to a scan mode at a scan mode start time;

maintaining the power save mode after transmitting the scan transition message until the scan mode start time;

commencing the scan mode at the scan mode start time, the scan mode alternating between an interleaving interval and a scan interval, the scan interval replacing the sleep interval of the power saving mode, and wherein during each scan interval the WAN modem scans neighbor base stations, the scan mode having a duration; and resuming power saving mode directly upon termination of the duration of the scan mode.

2. The method of claim 1, wherein transmitting the scan transition message comprises indicating, in the scan transition message, an offset indicating the start of the scan mode.

3. The method of claim 1 wherein the active interval of both the power save mode and the scan mode comprises a downlink frame and an uplink frame, and wherein the sleep interval comprises two frames where the wide area network modem operates in a sleep state, and wherein the scan interval comprises two frames.

4. The method of claim 1, wherein resuming power saving mode occurs at a frame indicated by a resume offset transmitted in the scan transition message.

5. The method of claim 1, wherein resuming power saving mode occurs in response to a reactivate power save mode message received from the serving base station during the scan mode.

6. The method of claim 1, wherein resuming power saving mode occurs in response to a power save transition message sent while the WAN modem is operating in the scan mode.

7. The method of claim 6, wherein the power save transition message is transmitted during a present active interval, a sleep interval then follows the present active interval, and wherein power save mode is re-established.

8. A mobile communication device, comprising:
a wide area network (WAN) modem configured to:
transmit, from the WAN modem while operating in the power saving mode, a scan transition message to a serving base station, the scan transition message indicating the WAN modem will transition to a scan mode at a scan mode start time;
maintain the power save mode after transmitting the scan transition message until the scan mode start time;
commence the scan mode at the scan mode start time, the scan mode alternating between an active interval and a scan interval, the scan interval replacing the sleep interval of the power saving mode, and wherein during each scan interval the WAN modem scans neighbor base stations, the scan mode having a duration; and
resume power saving mode directly upon termination of the duration of the scan mode.

9. The mobile communication device of claim 8, wherein the scan transition message includes an offset indicating the start of the scan mode.

10. The mobile communication device of claim 8, wherein the active interval of both the power save mode and the scan mode comprise a downlink frame and an uplink frame, and wherein the sleep interval comprises two frames where the WAN modem operates in a sleep state, and wherein the scan interval comprises two frames.

11. The mobile communication device of claim 8, wherein the WAN modem is configured to resume power saving mode at a frame indicated in a resume offset transmitted in the scan transition message.

12. The mobile communication device of claim 8, wherein the WAN modem is configured to resume power saving mode in response to a reactivate power save mode message received from the serving base station during the scan mode.

13. The mobile communication device of claim 8, wherein the WAN modem is configured to resume power saving mode in response to a power save transition message sent while the WAN modem is operating in the scan mode.

14. The mobile communication device of claim 13, wherein the power save transition message is transmitted by the WAN modem during a present active interval, a sleep interval then follows the present active interval, and wherein power save mode is re-established.

* * * * *